(12) United States Patent
Shindo et al.

(10) Patent No.: US 10,732,534 B2
(45) Date of Patent: Aug. 4, 2020

(54) PROCESS CARTRIDGE AND IMAGE FORMING APPARATUS

(71) Applicant: CANON KABUSHIKI KAISHA, Tokyo (JP)

(72) Inventors: Go Shindo, Mishima (JP); Shinichi Hagiwara, Tokyo (JP); Yoshihiro Mitsui, Numazu (JP); Kosuke Ikada, Machida (JP); Kentaro Yamawaki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/677,729

(22) Filed: Nov. 8, 2019

(65) Prior Publication Data
US 2020/0150552 A1 May 14, 2020

(30) Foreign Application Priority Data

Nov. 14, 2018 (JP) .................................. 2018-213884

(51) Int. Cl.
*G03G 15/02* (2006.01)
*G03G 15/16* (2006.01)
(Continued)

(52) U.S. Cl.
CPC ........... *G03G 15/0233* (2013.01); *C08K 3/04* (2013.01); *G03G 9/08* (2013.01); *G03G 15/0266* (2013.01);
(Continued)

(58) Field of Classification Search
CPC ........... G03G 15/0233; G03G 15/0266; G03G 15/1685; G03G 2215/0861; G03G 2221/183; G03G 9/08; C08K 3/04
See application file for complete search history.

(56) References Cited

U.S. PATENT DOCUMENTS 6,697,587 B2   2/2004   Harada
9,309,349 B2   4/2016   Watanabe
(Continued)

FOREIGN PATENT DOCUMENTS

EP   2666814 A1   11/2013
JP   2002003651 A   1/2002
(Continued)

OTHER PUBLICATIONS

Extended European Search Report issued in European Application No. 19208402.8 dated May 6, 2020.

*Primary Examiner* — Ryan D Walsh
(74) *Attorney, Agent, or Firm* — Rossi, Kimms & McDowell LLP

(57) ABSTRACT

A charging member that contacts an image bearing member and charges the image bearing member has an electrically conductive support and an elastic layer in contact with the image bearing member. The elastic layer includes a semi-conductive rubber composition including a matrix and domains having electric conductivity. The semiconductive rubber composition has a sea-island structure in which the domains form an island phase and the matrix forms a sea phase. The matrix has a higher volume resistivity than the domains. The developer includes a toner, and the toner has a Martens hardness of at least 200 MPa and not more than 1100 MPa when measured under a maximum load of $2.0 \times 10^{-4}$ N.

8 Claims, 6 Drawing Sheets

(51) Int. Cl.
*C08K 3/04* (2006.01)
*G03G 9/08* (2006.01)

(52) U.S. Cl.
CPC . *G03G 15/1685* (2013.01); *G03G 2215/0861* (2013.01); *G03G 2221/183* (2013.01)

(56) References Cited

U.S. PATENT DOCUMENTS

| | | | |
|---|---|---|---|
| 9,459,547 B2 | 10/2016 | Terasaki | |
| 10,545,422 B2 * | 1/2020 | Yamawaki | G03G 9/08755 |
| 2012/0224887 A1 * | 9/2012 | Harada | G03G 15/0233 |
| | | | 399/168 |
| 2014/0051019 A1 * | 2/2014 | Sekiguchi | G03G 9/08764 |
| | | | 430/105 |
| 2015/0072287 A1 | 3/2015 | Amemori | |
| 2017/0299972 A1 | 10/2017 | Tanaka | |
| 2018/0329327 A1 * | 11/2018 | Yamawaki | G03G 9/0825 |
| 2019/0369512 A1 * | 12/2019 | Okuda | G03G 5/0546 |
| 2019/0369529 A1 * | 12/2019 | Yagi | G03G 15/162 |

FOREIGN PATENT DOCUMENTS

| | | | | |
|---|---|---|---|---|
| JP | 2010032596 A | * | 2/2010 | |
| JP | 2013114092 A | * | 6/2013 | |
| JP | 2015141360 A | | 8/2015 | |
| JP | 2015191199 A | | 11/2015 | |
| JP | 2016081047 A | | 5/2016 | |

* cited by examiner

PROCESS CARTRIDGE AND IMAGE FORMING APPARATUS

BACKGROUND OF THE INVENTION

Field of the Invention

The present invention relates to an electrophotographic image forming apparatus. Here, the electrophotographic image forming apparatus (hereinafter also simply referred to as "image forming apparatus") refers to an apparatus in which an image on a recording material (recording medium) is formed using an electrophotographic image forming system. Examples of the image forming apparatus include a copying machine, a printer (laser beam printer, LED printer, and the like), a facsimile machine, a word processor, and a multifunction machine (multifunction printer) thereof.

Description of the Related Art

In an electrophotographic image forming apparatus, the surface of an electrophotographic photosensitive member (hereinafter referred to as a photosensitive drum or drum) is uniformly charged by a primary charger, and the charged photosensitive drum surface is exposed by an exposure device to form an electrostatic latent image. The electrostatic latent image is developed by a developing device to form a developer image (hereinafter referred to as a toner image), and the toner image is transferred to a recording material such as a sheet by a transfer device. Thereafter, the toner image is fixed on the recording material as a fixed image by a fixing device and outputted. A toner remaining on the surface of the photosensitive drum after the toner image is transferred is cleaned by a cleaning device and provided for the next image forming operation.

The developing device, the photosensitive drum, and the cleaning device are sometimes integrally configured as a process cartridge that can be detachably attached to the image forming apparatus.

From the viewpoint of simplicity of configuration and toner removal capability, counter-type blade cleaning in which a cleaning blade configured of an elastic body is brought into contact in the counter direction with respect to the rotation direction of the photosensitive drum is widely used in a cleaning device. In the counter-type blade cleaning, the cleaning blade is strongly brought into contact with and rubbed against the photosensitive drum. For this reason, the driving torque of the photosensitive drum accounts for a larger part of the process cartridge driving torque.

Further, in recent years, a contact charging system as a charging device has been installed in many image forming apparatuses and has become the mainstream of charging devices. In most of the contact charging systems, a conductive roller is used as a contact charging member, and roller charging is used in which a voltage is applied by bringing the conductive roller into contact with the photosensitive drum.

A conductive roller is known in which an elastic layer is formed using a conductive rubber composition of an electron conductive system into which conductive particles such as carbon black are blended in order to impart the elastic layer with a conductivity of about $1 \times 10^4$ Ω·cm to $1 \times 10^8$ Ω·cm in terms of volume resistivity. However, the elastic layer formed in this way has a problem that the electric resistance thereof strongly depends on the dispersed state of the conductive particles, and the resistance unevenness in the roller is large. Further, the ease of transfer of the electric charge between the conductive particles due to the electric field effect varies depending on the applied voltage. Therefore, the voltage dependence of the electric resistance value is large.

In an ion conductive material, the moving speed of ions changes depending on the ambient temperature, humidity and the like. Therefore, the environmental dependency of the electric resistance value is large. Thus, both the electron conductive system and the ion conductive system have a problem in the stability of charging performance.

With respect to such a problem, Japanese Patent Application Laid-open No. 2002-003651 proposes the following semiconductive rubber composition as a semiconductive rubber composition in which the electric resistance value can be easily set and voltage dependency and environmental fluctuation are small, and also proposes a charging member using such a composition. That is, this semiconductive rubber composition has a matrix-domain structure (sea island structure) including a matrix made of an ion conductive rubber material and a domain made of an electron conductive rubber material. The surface (circumferential surface) of the elastic layer of the charging member is configured such that a plurality of electron conductive rubber material portions is scattered on the surface made of the ion conductive rubber material. The charging member of a sea-island structure composed of a single layer of this type is characterized in that dirt such as an external additive is likely to adhere selectively to the matrix portion having high resistance, but has little influence on the image.

Patent Literature 1: Japanese Patent Application Laid-open No. 2002-003651

SUMMARY OF THE INVENTION

However, the above prior art has the following problems. In the charging member having a sea-island structure such as described in Japanese Patent Application Laid-open No. 2002-003651, where a continuous image formation is performed and a solid image or a halftone image is outputted, a white-spotted image can be generated in which image portions are missing to form white spots.

The results of detailed analysis showed that the toner was melted and fixedly attached to the photosensitive drum (hereinafter referred to as drum fusion). It was found that the toner fused to the photosensitive drum blocked the laser beam, thereby generating a white-spotted image in which image portions were missing to form white spots. This was a phenomenon in which the leaked toner scattered in the machine, adhered to the matrix portion of the charging member having a high resistance, and was crushed between the charging member and the photosensitive drum as the photosensitive drum rotated, thereby causing fusion of the toner to the photosensitive drum. This phenomenon was prominent when the usage frequency of the process cartridge or image forming apparatus increased.

An object of the present invention is to provide a process cartridge and an image forming apparatus capable of suppressing image defects due to fusion of a toner (developer) to a photosensitive drum (image bearing member).

The present invention provides a process cartridge for use in an image forming apparatus, comprising:
an image bearing member;
a charging member configured to contact the image bearing member and charge the image bearing member;

a developer bearing member configured to contact the image bearing member and bear a developer for developing a latent image formed on the charged image bearing member;

wherein, the charging member has an electrically conductive support and an elastic layer in contact with the image bearing member;

the elastic layer includes a semiconductive rubber composition including a matrix and domains having electric conductivity;

the semiconductive rubber composition has a sea-island structure in which the domains form an island phase and the matrix forms a sea phase;

the matrix has a higher volume resistivity than the domain;

the developer includes a toner; and the toner has a Martens hardness of at least 200 MPa and not more than 1100 MPa when measured under a maximum load of $2.0 \times 10^{-4}$ N.

The present invention provides an image forming apparatus comprising:

an apparatus main body; and the process cartridge that is detachably attachable to the apparatus main body.

According to the present invention, it is possible to suppress image defects due to fusion of the toner (developer) to the photosensitive drum (image bearing member).

Further features of the present invention will become apparent from the following description of exemplary embodiments with reference to the attached drawings.

DESCRIPTION OF THE EMBODIMENTS

In the present invention, the expression of "at least AA and not more than BB" or "AA to BB" representing a numerical range means a numerical range including a lower limit and an upper limit as end points unless otherwise specified.

Hereinafter, exemplary embodiments or examples of the present invention will be described in detail with reference to the drawings. However, since the dimensions, materials, shapes, relative positions, etc. of the components described in the embodiment or examples are appropriately changed depending on the configuration of the apparatus to which the invention is applied and various conditions, the scope of the intention is not intended to be limited thereby, unless specifically stated otherwise. Each of the embodiments of the present invention described below can be implemented solely or as a combination of a plurality of the embodiments or features thereof where necessary or where the combination of elements or features from individual embodiments in a single embodiment is beneficial.

Unless clearly indicated otherwise, "parts" means "parts by mass", and commercially available high-purity products were used unless indicated otherwise.

Embodiment 1

General Configuration of Image Forming Apparatus

Figure 1:
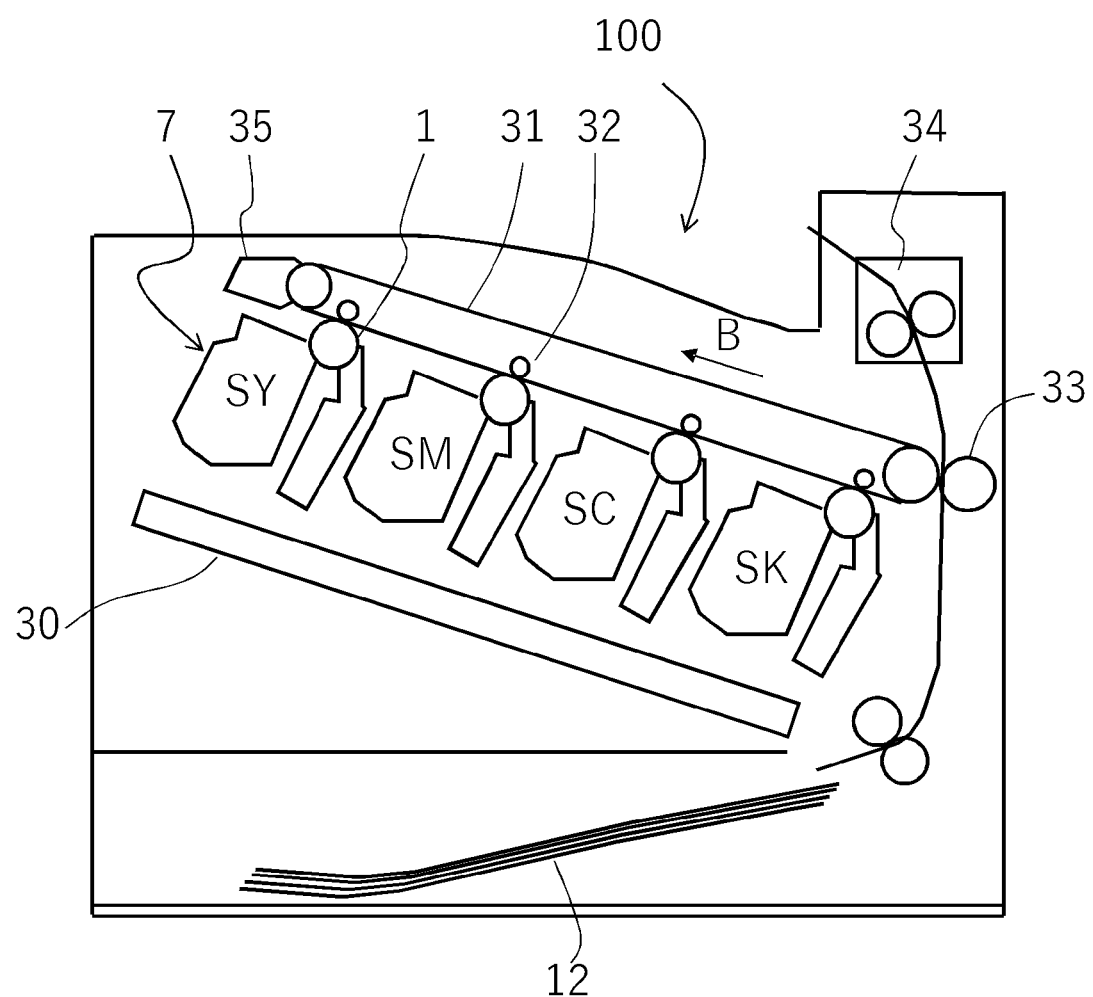
FIG. 1 is a schematic sectional view of an image forming apparatus according to an embodiment of the present invention.

The overall configuration of an embodiment of one electrophotographic image forming apparatus will be described with reference to FIG. 1. FIG. 1 is a schematic cross-sectional view of an image forming apparatus 100 according to an embodiment of the present invention. Examples of the image forming apparatus to which the present invention can be applied include a copying machine, a printer and the like using an electrophotographic system. In the case described herein, the present invention is applied to a full color laser beam printer using a tandem system and an intermediate transfer system as the image forming apparatus 100 of the present embodiment.

The image forming apparatus 100 can form a full-color image on a recording material (for example, recording paper, plastic sheet, cloth, and the like) according to image information. The image information is inputted to the image forming apparatus main body from an image reading device connected to the image forming apparatus main body or a host device such as a personal computer communicably connected to the image forming apparatus main body.

In the image forming apparatus 100, process cartridges 7 as a plurality of image forming units have first to fourth image forming units SY, SM, SC, SK for forming yellow (Y), magenta (M), cyan (C), and black (K) images, respectively. In the present embodiment, the image forming units SY, SM, SC, and SK are arranged in a row in a direction that intersects the vertical direction.

Further, in the present embodiment, the configurations and operations of the first to fourth image forming units SY, SM, SC, SK are substantially the same except that the colors of images to be formed are different. Therefore, in the following general explanation, the symbols Y, M, C, K given to the reference numerals to indicate that they are elements provided for a certain color are omitted, unless there is a particular distinction.

The process cartridge 7 can be attached to and detached from the image forming apparatus 100 by using mounting means such as a mounting guide and a positioning member provided at the image forming apparatus main body. In the present embodiment, the process cartridges 7 for the respective colors all have the same shape, and the process cartridge 7 for each color accommodates a toner (developer) of respective color: yellow (Y), magenta (M), cyan (C), and black (K). In the present embodiment, a configuration in which the process cartridge can be detachably attached to the apparatus main body will be described. However, a developing device alone may be configured to be detachably attachable to the image forming apparatus main body.

A photosensitive drum 1 as an image bearing member that bears an electrostatic image (electrostatic latent image) is rotationally driven by a driving means (drive source) not shown in the figure. The image forming apparatus 100 is provided with a scanner unit (exposure device) 30. The scanner unit 30 is an exposure means for emitting a laser beam on the basis of image information to form an electrostatic image (electrostatic image) on the photosensitive drum 1. Further, in the image forming apparatus 100, an intermediate transfer belt 31 as an intermediate transfer body for transferring the toner image on the photosensitive drum 1 to a recording material 12 is disposed so as to face the four photosensitive drums 1.

The intermediate transfer belt 31 formed of an endless belt as an intermediate transfer member is in contact with all the photosensitive drums 1 and circulates (rotates) in the direction indicated by an arrow B (counterclockwise) in the figure.

On the inner circumferential surface side of the intermediate transfer belt 31, four primary transfer rollers 32 serving as primary transfer means are arranged side by side so as to face the respective photosensitive drums 1. A voltage having a polarity opposite to the normal charging polarity of the toner is applied to the primary transfer roller 32 from a primary transfer bias power source (high-voltage power source) as a primary transfer bias applying means (not shown). As a result, the toner image on the photosensitive drum 1 is transferred (primary transfer) onto the intermediate transfer belt 31.

Further, a secondary transfer roller 33 as a secondary transfer unit is disposed on the outer circumferential surface side of the intermediate transfer belt 31. A voltage having a polarity opposite to the normal charging polarity of the toner is applied to the secondary transfer roller 33 from a secondary transfer bias power source (high-voltage power source) as a secondary transfer bias applying means (not shown). As a result, the toner image on the intermediate transfer belt 31 is transferred (secondary transfer) to the recording material 12. For example, when forming a full-color image, the above-described process is sequentially performed in the image forming units SY, SM, SC, SK, and the toner images of respective colors are sequentially superimposed and primarily transferred onto the intermediate transfer belt 31. Thereafter, the recording material 12 is conveyed to the secondary transfer portion in synchronization with the movement of the intermediate transfer belt 31. The four-color toner image on the intermediate transfer belt 31 is secondarily transferred as a whole onto the recording material 12 by the action of the secondary transfer roller 33 which is in contact with the intermediate transfer belt 31 with the recording material 12 being interposed therebetween.

The recording material 12 to which the toner image has been transferred is conveyed to a fixing device 34 as a fixing means. The toner image is fixed on the recording material 12 by applying heat and pressure to the recording material 12 in the fixing device 34.

General Configuration of Process Cartridge

The overall configuration of the process cartridge 7 mounted on the image forming apparatus of the present embodiment will be described hereinbelow.

Figure 2:
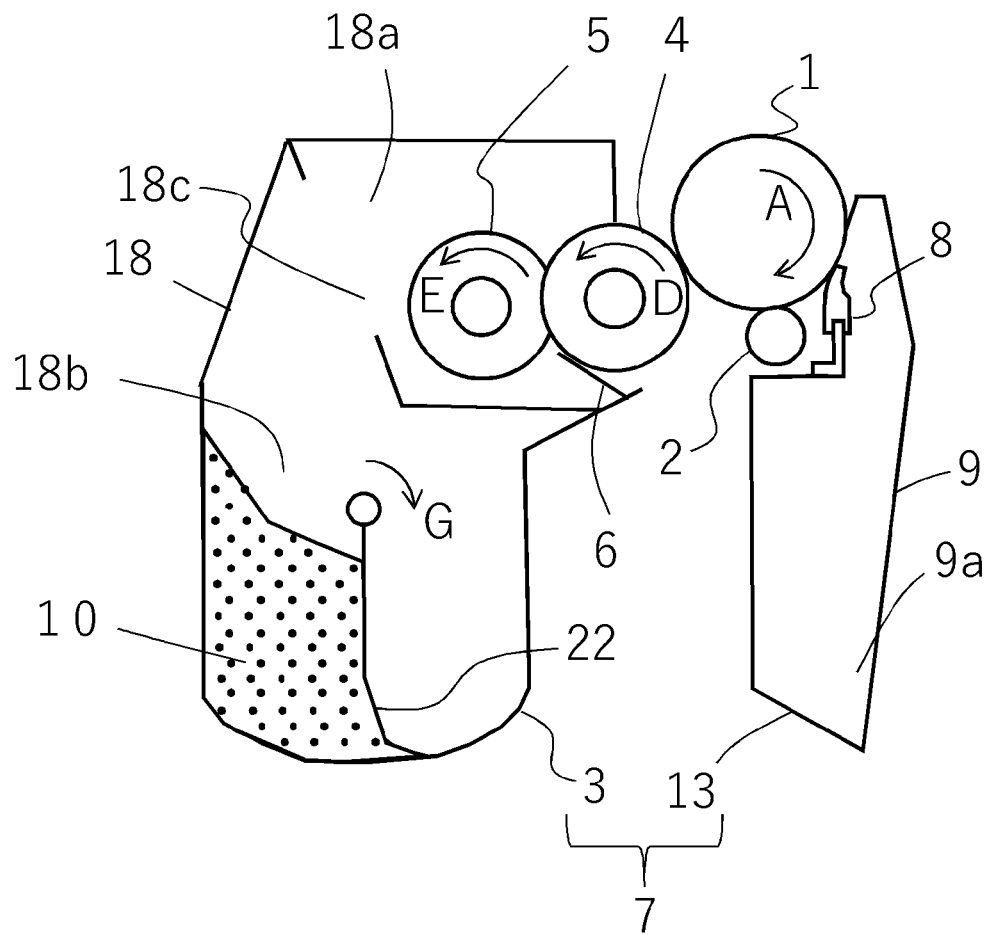
FIG. 2 is a schematic sectional view of the process cartridge according to the embodiment of the present invention.

FIG. 2 is a cross-sectional view (main cross-sectional view) of the process cartridge 7 of the present embodiment taken along the longitudinal direction (rotational axis direction) of the photosensitive drum 1. In the present embodiment, the configuration and operation of the process cartridge 7 for each color are substantially the same except for the type (color) of the developer stored therein. Each operation in the present embodiment is controlled by a control unit (control means) of a CPU (not shown).

The posture of the process cartridge 7 in FIG. 2 is a posture in which the process cartridge 7 is mounted on the image forming apparatus main body (during use). In this description, when the positional relationship and direction of each member of the process cartridge are described, the positional relationship and direction in this posture are indicated. That is, the up-down direction in FIG. 2 corresponds to the gravity direction (vertical direction), and the left-right direction corresponds to the horizontal direction. The arrangement configuration is set on the assumption that the image forming apparatus is installed on a horizontal plane in a normal installation state.

The process cartridge 7 includes a developing unit 3 including a developing roller 4 or the like and a photosensitive member unit 13 including the photosensitive drum 1 or the like.

The developing unit 3 includes the developing roller 4, a toner supply roller 5, a toner conveying member 22, and a developing frame 18 that rotatably supports them. The developing frame 18 includes a development chamber 18*a* in which the developing roller 4 and the toner supply roller 5 are disposed, and a developer storage chamber 18*b* in which the toner 10 is stored. The development chamber 18*a* and the developer storage chamber 18*b* communicate with each other through an opening 18*c*. The developer storage chamber 18*b* is disposed below the development chamber 18*a*. In the developer storage chamber 18*b*, the toner 10 serving as a developer is stored. In the present embodiment, the normal charging polarity of the toner 10 is negative. Here, the normal charging polarity is a charging polarity for developing an electrostatic image. In the present embodiment, since the negative electrostatic image is reversely developed, the normal charging polarity of the toner is negative. However, the present invention is not limited to the negatively chargeable toner.

The developer storage chamber 18*b* is provided with the toner conveying member 22 for conveying the toner 10 to the development chamber 18*a*. As the toner conveying member rotates in the direction of arrow G in the figure, the toner 10 is conveyed to the development chamber 18*a*.

The development chamber 18*a* is provided with the developing roller 4 as a developer bearing member that contacts the photosensitive drum 1 and rotates in the direction of the arrow D shown in the drawing. In the present embodiment, the developing roller 4 and the photosensitive drum 1 rotate so that their surfaces move in the same direction at the facing portion, that is, so that the rotation directions thereof are opposite to each other. A voltage sufficient to develop and visualize the electrostatic image on the photosensitive drum 1 as a toner image is applied to the developing roller 4 from a first power supply (high-voltage power supply) (not shown) serving as a first voltage applying means.

Further, a toner supply roller (hereinafter simply referred to as "supply roller") 5 as a developer supply member that supplies the toner 10 conveyed from the toner storage chamber 18*b* to the developing roller 4 is disposed inside the development chamber 18*a*. Disposed therein is also a developer amount regulating member (hereinafter simply referred to as "regulating member") 6 that regulates the coat amount of the toner on the developing roller 4 supplied by the supply roller 5 and performs charge application.

The supply roller 5 is an elastic sponge roller having a conductive mandrel and a foam layer on the surface. The supply roller 5 is disposed to form a contact portion between the supply roller and the developing roller 4, and rotates in the direction of the arrow E in the drawing. However, the rotation direction of the supply roller may be opposite to E.

Further, a voltage is applied to the supply roller 5 from a second power source (high-voltage power source) (not shown) as a second voltage applying means.

The toner 10 supplied to the developing roller 4 by the supply roller 5 enters the contact portion between the regulating member 6 and the developing roller 4 as a result of rotation of the developing roller 4 in the arrow D direction. The toner 10 is triboelectrically charged and imparted with an electric charge by rubbing between the developing roller 4 and the regulating member 6, and at the same time, the toner layer thickness is regulated. The regulated toner 10 on the developing roller 4 is conveyed to a portion facing the photosensitive drum 1 by the rotation of the developing roller 4, and the electrostatic image on the photosensitive drum 1 is developed and visualized as a toner image.

Meanwhile, the photosensitive member unit 13 includes a cleaning frame 9 as a frame that supports various components of the photosensitive member unit 13 such as the photosensitive drum 1. The photosensitive drum 1 is rotatably attached to the cleaning frame 9 through a bearing (not shown). The photosensitive drum 1 is an organic photosensitive member drum and has an outer diameter of 24 mm. By receiving the driving force of a driving motor (not shown) as drum driving means, the drum is rotated in the direction of arrow A in the drawing.

Further, the charging roller 2 and a cleaning blade 8 as a cleaning member are disposed in the photosensitive member unit 13 so as to come into contact with the circumferential surface of the photosensitive drum 1. The charging roller 2 is urged in a direction toward the photosensitive drum 1 by a spring (not shown) as an urging means, and is driven to rotate as the photosensitive drum 1 rotates.

The cleaning blade 8 slides and rubs the photosensitive drum 1 at a relative speed equal to the surface speed of the photosensitive drum 1 by the rotation of the photosensitive drum 1, scrapes off the toner 10 remaining in the transfer process, and prevents contamination of the charging roller 2 as a charging member by residual toner and the like. Further, discharge products adhering to the surface of the photosensitive drum 1 in the charging step are removed to prevent an increase in friction of the photosensitive drum 1.

The toner scraped off by the cleaning blade 8 is stored in a recovery chamber 9a. A configuration may be adopted in which the toner is stored in a toner recovery container provided in the image forming apparatus through the toner recovery chamber 9a.

The charging roller 2, which is a charging means, rotates by following the rotating photosensitive drum 1 when the roller portion of the conductive rubber is brought into pressure contact with the photosensitive drum 1. A predetermined direct current voltage (Vpri), with respect to the photosensitive drum 1, is applied to the core of the charging roller 2 as a charging step, whereby a uniform dark portion potential (Vd) is formed on the surface of the photosensitive drum 1. The laser beam spot pattern emitted by the laser beam from the scanner unit 30 correspondingly to the image data exposes the photosensitive drum 1, and the surface charge on the exposed portion is decreased by carriers from the carrier generation layer and the potential drops. As a result, an electrostatic latent image is formed on the photosensitive drum 1 with a predetermined bright portion potential (Vl) at the exposed portion and a predetermined dark portion potential (Vd) at the unexposed portion. As an example of the present embodiment, Vpri=−1040 V, Vd=−500 V, and Vl=−100 V. The toner adhering to the charging roller 2 receives a force at the contact portion between the charging roller 2 and the photosensitive drum 1 by an electric field formed by the voltage applied to the charging roller 2 and the dark portion potential of the photosensitive drum 1.

Meanwhile, the developing unit 3 has a developing roller 4 as a developer bearing member for bearing the toner and development chamber 18a in which a toner supply roller 5 as a supply member for supplying toner to the developing roller 4 is arranged. Further, the developing unit 3 has a developer storage chamber (toner storage portion) 18b for storing the toner below the toner supply roller 5 in the direction of gravity. A contact portion between the end portions of the developing unit 3 and the developing roller 4 in the longitudinal direction is provided with an end seal (not shown) for suppressing toner leakage. Although this end seal can prevent most of the toner leakage, the toner leakage is difficult to prevent completely because minute gaps still cannot be filled and also because small-diameter toner particles are generated due to variations in toner particle diameter in production.

Explained hereinbelow is the behavior of the toner when the toner with low charging performance which has been scattered due to toner leakage adheres to the charging roller 2.

The charging member of the present invention has an electrically conductive support and an elastic layer in contact with the image bearing member, the elastic layer includes a semiconductive rubber composition including a matrix and domains having conductivity, the matrix has a higher volume resistivity than the domains, and the semiconductive rubber composition has a sea-island structure in which the domains form an island phase and the matrix forms a sea phase.

As described above, the charging roller 2 used in the present embodiment has a configuration in which the elastic layer having the so-called sea-island structure is in contact with the photosensitive drum 1. Therefore, the discharge with respect to the adhered toner differs between the sea phase and the island phase in the sea-island structure. First, the toner with low charging performance that has adhered to the sea phase is immediately charged by the discharge from the charging roller 2. Next, since the toner with low charging performance that has adhered to the island phase is unlikely to be affected by the discharge, this toner is gradually contact-charged by repeatedly passing through the contact portion with the photosensitive drum 1 while being attached to the charging roller 2. It was also found that as a result of repeatedly passing through the contact portion with the photosensitive drum 1 while being attached to the charging roller 2 in a state without drum fusion, the toner moves slightly on the charging roller 2, and the discharge-induced charging is obtained when the toner reaches the sea phase. It is a feature of the present invention that the problem of the toner crushing and causing the drum fusion is resolved by the clinging of the toner to the sea phase.

The rotation directions of the developing roller 4 and the photosensitive drum 1 are opposite to each other. In other words, the rotation directions are such that the respective surfaces of the opposing portions of the developing roller and the photosensitive drum move in the same direction (in this embodiment, the direction is from the bottom to the top).

Further, a toner charged negatively by triboelectric charging is moved only to the bright potential portion to visualize the electrostatic latent image by a predetermined DC bias (development bias) applied to the developing roller 4 due to a difference in potential with the development bias at a developing nip portion where the toner contacts the photosensitive drum 1. In this embodiment, the developing bias is −300 V.

In the present embodiment, both the developing roller 4 and the toner supply roller 5 have an outer diameter of 15 mm. Further, the amount of penetration of the toner supply roller 5 into the developing roller 4, that is, the amount of recess ΔE in which the toner supply roller 5 is concaved by the developing roller 4, is set to 1.0 mm. The toner supply roller 5 and the developing roller 4 are arranged so that the center height is the same.

The developing blade 6 is disposed so as to face the counter direction with respect to the rotation of the developing roller 4 and is a member that regulates the amount of toner borne on the developing roller 4. Further, the toner borne on the developing roller 4 is provided with a charge by triboelectric charging by the peripheral friction between the developing blade 6 and the developing roller 4, and at the same time, the layer thickness thereof is regulated. In the present embodiment, a leaf spring-shaped stainless steel (SUS) thin plate is used as the developing blade 6. Here, the configuration of the developing blade 6 is not limited to this, and a thin metal plate made of phosphor bronze or aluminum may be also used. The surface of the developing blade 6 may be also coated with a thin film such as polyamide elastomer, urethane rubber, or urethane resin. Further, a predetermined voltage is applied as a blade bias (Vb) to the developing blade 6 from a blade bias power source (not shown).

Description of Charging Roller
Elastic Layer

The configuration of the elastic layer of the charging roller 2 in the present embodiment will be described with reference to FIG. 3. The elastic layer of the charging roller 2 of the present embodiment is a semiconductive rubber composition formed from two or more types of rubber. The elastic layer includes conductive domains 212 mainly composed of a raw material rubber A and a matrix 211 mainly composed of a raw material rubber B, and the matrix has a higher volume resistivity than the domains.

The domains 212 form the island phase of the sea-island structure, and the matrix 211 forms the sea phase. That is, a circumferential surface structure (pattern) is formed such that portions (islands) composed of domains 212 are scattered on the surface (sea) made up of the matrix 211. By constructing the sea-island structure, it is possible to produce a semiconductive rubber composition with small voltage dependency and variation in electric resistance and small environmental dependency of electric resistance.

Domains

The domains 212 in the present embodiment are conductive and preferably have the raw material rubber A blended with a conductive agent.

Carbon black, graphite, conductive oxides such as tin oxide, metals such as copper and silver, conductive particles provided with conductivity by covering the particle surface with an oxide or a metal, and ionic conductive agents having ion exchange performance such as quaternary ammonium salts may be used as the conductive agent. Examples of the ionic conductive agents include inorganic ionic substances such as lithium perchlorate, sodium perchlorate, and calcium perchlorate; cationic surfactants such as lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide, and modified aliphatic dimethylethyl ammonium ethosulphate; amphoteric surfactants such as lauryl betaine, stearyl betaine, and dimethylalkyllauryl betaines; quaternary ammonium salts such as tetraethylammonium perchlorate, tetrabutylammonium perchlorate and trimethyloctadecylammonium perchlorate; and organic acid lithium salts such as lithium trifluoromethanesulfonate. These may be used alone or in combination of two or more.

The blending amount of the conductive agent is generally at least 1 part by mass and not more than 200 parts by mass with respect to 100 parts by mass of the raw material rubber A.

The conductive agent of the present embodiment is preferably one that reduces the electric resistance value so as not to cause streak-like density changes on the image through the use environment and long-term use. Further, it is preferable that a conductive agent that is electron conductive be included. Specifically, the domains preferably include carbon black, graphite, a conductive oxide such as tin oxide, a metal such as copper and silver, and conductive particles imparted with electric conductivity by coating the particle surface with an oxide or a metal. It is more preferable that carbon black be included.

The raw material rubber A is not particularly limited, and rubbers known in the field of conductive members for electrophotography can be used. Specific examples include natural rubber, isoprene rubber, butadiene rubber, styrene-butadiene, butyl rubber, ethylene-propylene rubber, ethylene-propylene-diene terpolymer rubber, silicone rubber and the like.

Matrix

The matrix 211 in the present embodiment has a higher volume resistivity than the domains 212.

The raw material rubber B forming the matrix 211 is not particularly limited, and rubbers known in the field of conductive members for electrophotography can be used. Specific examples include epichlorohydrin homopolymer, epichlorohydrin-ethylene oxide copolymer, epichlorohydrin-ethylene oxide-allyl glycidyl ether terpolymer, acrylonitrile-butadiene copolymer, acrylonitrile-butadiene copolymer hydrogenation product, and rubbers such as silicone rubber, acrylic rubber and urethane rubber which are used individually or as blends of two or more thereof. In order to reduce the amount of contamination defects on the charging roller 2, it is preferable that the second raw material rubber B have a lower volume resistivity than the raw material rubber A forming the domains 212.

It is preferable that the raw material rubber B be a polar rubber, the raw material rubber A be incompatible with the raw material rubber B, and the Sp value of the raw material rubber A be smaller than the Sp value of the raw material rubber B.

Generally, when two or more kinds of rubber are blended, depending on the mixing conditions, etc., the greater the difference in SP value between the rubbers, the more incompatible the rubbers and the more stable the sea-island structure that is formed.

Measurement of Volume Resistivity

For the measurement of volume resistivity of the domains 212 and the matrix 211, a measurement value (volume resistivity) measured by the conductive mode using an atomic force microscope (AFM) can be adopted. A part of the elastic layer is cut out using a manipulator, and metal vapor deposition is performed on one side of the slice. A DC power source is connected to the surface on which metal deposition has been performed, a voltage is applied, a free end of a cantilever is brought into contact with the other surface of the cut slice, and a current image is obtained through the AFM main body. A current value at 10 locations is randomly measured in the domains 212 and the matrix 211, and the volume resistivity can be calculated from the average current value at the top 10 locations with the low current values, the average film thickness and the contact area of the cantilever. Further, by observing a current image obtained by AFM, the volume resistivity relationship between the domains 212 and the matrix 211 can be easily evaluated.

Formation of Sea-Island Structure

Generally, in the case of a blend of incompatible rubbers, a sea-island structure thereof depends on the viscosity of each rubber and kneading conditions, but rubber having a large composition ratio tends to become a sea phase. Therefore, by increasing the ratio of the raw material rubber B forming the matrix 211 in the present embodiment, it is possible to form the domains 212 as an island phase and the matrix 211 as a sea phase.

Specifically, the blending ratio of the raw material rubbers B and A, that is, the (raw material rubber B)/(raw material rubber A) ratio (mass ratio) is preferably in the range of 95/5 to 40/60.

Furthermore, the volume resistivity of the elastic layer can be changed by changing the blending ratio of the domains 212 (island phase) and the matrix 211 (sea phase) and changing the presence ratio of the domains 212 (island phase). Therefore, the volume resistivity of the obtained charging roller 2 can be easily set to a desired value.

Production Method

As a method for forming the elastic layer, it is preferable to mix the raw materials of the conductive elastic body with a closed mixer and form the elastic layer by a known method such as extrusion molding, injection molding, or compression molding. Further, the elastic layer may be produced by directly molding the conductive elastic body on a conductive substrate, or a conductive elastic body molded in advance into a tube shape may be coated on a conductive substrate. The surface may be polished and the shape may be adjusted after the elastic layer is formed.

Figure 4:
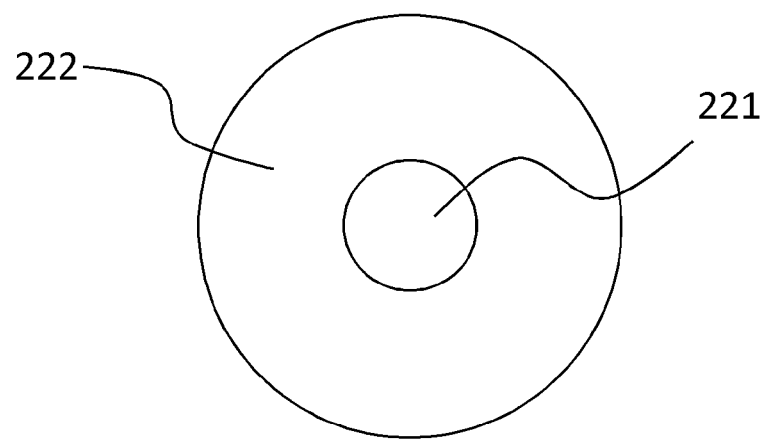
FIG. 4 is a schematic cross-sectional view for explaining an example of a charging roller in the embodiment of the present invention.

FIG. 4 shows the configuration of the charging roller 2 as an example of the charging member (conductive member) in the present embodiment. In this configuration, an elastic layer 222 is formed as the elastic layer on the outer periphery of a core 221 which is made of metal.

In order to charge uniformly the surface of the photosensitive drum 1 (object to be charged), it is preferable that the elastic layer 222 of the charging roller 2 have a uniform semi-conductivity, and in order to ensure uniform contact with the photosensitive drum 1, it is preferable that a JIS-A hardness of the elastic layer be made 60° or less.

Electric Resistance Value of Charging Roller

Figure 5:
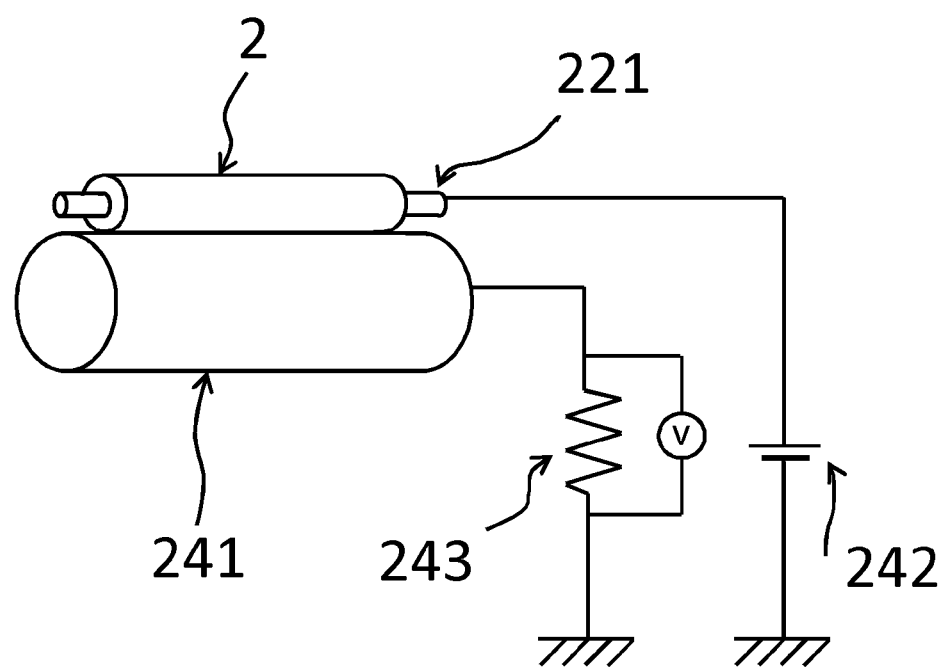
FIG. 5 is a schematic cross-sectional view illustrating an apparatus for measuring volume intrinsic resistivity.

FIG. 5 shows a schematic diagram of a device for measuring the electric resistance of the charging roller 2. The charging roller 2 is pressed against a cylindrical aluminum drum 241 by pressing means (not shown) at both ends of the core 221 and is driven to rotate following the rotation of the aluminum drum 241. In this state, a DC voltage is applied to the core portion 221 of the charging roller 2 by using an external power source 242, and the electric resistance value of the charging roller 2 can be measured from the voltage applied to a reference resistor 243 connected in series to the aluminum drum 241.

When a voltage of 100 V is applied in an environment of 23° C. and 55% RH, values at least $1\times10^6 \Omega$ and not more than $1\times10^{14} \Omega$ serve as guidelines for the electric resistance value of the charging roller 2 in the present embodiment. Among them, the volume resistivity of the charging roller 2 in the present embodiment is preferably at least $1\times10^6$ $\Omega\cdot$cm and not more than $1\times10^9$ $\Omega\cdot$cm.

When the electric resistance value of the charging roller 2 in the present embodiment is $1\times10^6 \Omega$ or more, the increase in the downstream discharge amount becomes significant. As a result, the toner can be negatively charged by using the downstream discharge with respect to the toner that has passed by the charging roller 2. Further, by setting the electric resistance value of the charging roller 2 of the present embodiment to $1\times10^9 \Omega$ or less, it is possible to further suppress the occurrence of image defects due to insufficient electric resistance.

Further, the uniformity of the electrical characteristics of the elastic layer 222 can be determined by rotating the charging roller 2 once, measuring the maximum value and the minimum value of the electric resistance value during the rotation, and taking the circumferential unevenness calculated from the maximum value/minimum value as an indicator of the uniformity. The circumferential unevenness is preferably 1.5 or less.

Further, the charging roller 2 may be driven by the photosensitive drum 1 that is driven by surface movement, and may be actively rotationally driven at a predetermined circumferential speed in the forward direction or reverse direction with respect to the surface movement direction of the photosensitive drum 1, that is, may be rotated by receiving a driving force from a power source such as a motor.

Toner

The toner of the present invention has a Martens hardness of at least 200 MPa and not more than 1100 MPa when measured under a condition of a maximum load of $2.0\times10^{-4}$ N.

Further, the toner has a toner particle, the toner particle has a surface layer including an organosilicon polymer, and it is preferable that the average number of carbon atoms directly bonded to a silicon atom of the organosilicon polymer is at least 1 and not more than 3 per one silicon atom.

Figure 6:
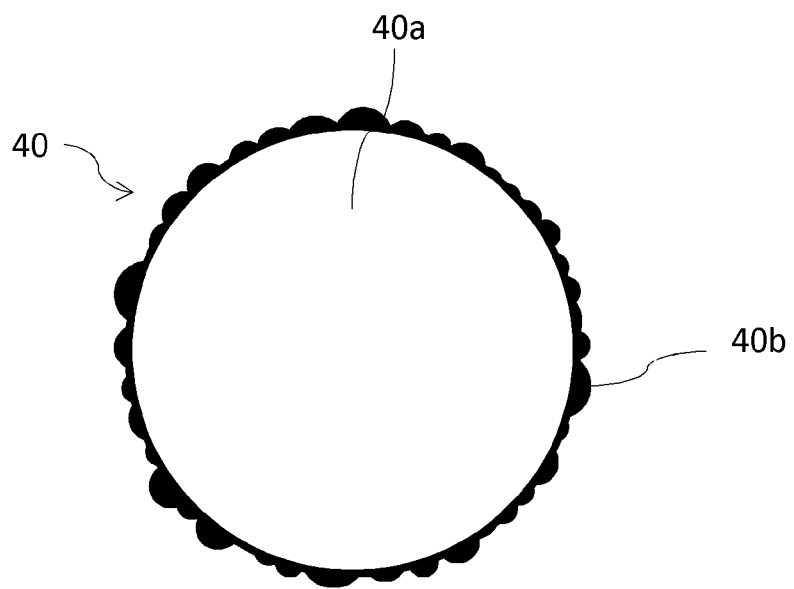
FIG. 6 is a schematic diagram of the toner in the embodiment of the present invention.

FIG. 6 is a schematic diagram of a toner 40 used in the present embodiment. As described above, in the case of a conventionally used toner, the toner may be crushed and drum fusion may occur due to the clinging of the toner to the island phase of the charging roller 2. As a result of examining the Martens hardness of the toner necessary for suppressing the drum fusion, the inventors of the present invention have found that the Martens hardness, when measured under the maximum toner load of $2.0\times10^{-4}$ N, is 200 MPa or more, and preferably 500 MPa or more. Meanwhile, the Martens hardness is 1100 MPa or less.

Where the Martens hardness is higher than 1100 MPa, the regulating blade 6 and the developing roller 4 may be damaged, and an image defect in the form of vertical stripe-like density unevenness (vertical stripe image) may appear in a solid black image or an intermediate gradation image.

Meanwhile, the Martens hardness measured under the condition of the maximum load of toner of $9.8\times10^{-4}$ N is preferably at least 5 MPa and not more than 100 MPa, and more preferably at least 10 MPa and not more than 80 MPa. This load of $9.8\times10^{-4}$ N is considered to correspond to the shear received in the cleaning unit. Where the Martens hardness at this load is in the above range, toner slip-through is unlikely to occur in the cleaning unit because the toner has an appropriate softness. That is, the toner is hard with respect to the shear associated with the developing unit, and has an appropriate softness with respect to the shear associated with the cleaning unit.

As a means for controlling the Martens hardness of the toner, for example, a toner particle having a surface layer including an organosilicon polymer may be used. The toner used in the present embodiment is a negatively chargeable non-magnetic one-component particle polymerization toner, and the particle diameter is about 7 μm.

Method for Producing Toner Particles

As a method for producing toner particles, known means can be used, and a kneading and pulverizing method or a wet production method can be used. From the viewpoint of uniform particle diameter and shape controllability, a wet production method can be preferably used. Furthermore, examples of the wet production method include a suspension polymerization method, a dissolution suspension method, an emulsion polymerization aggregation method, and an emulsion aggregation method.

Here, the suspension polymerization method will be described. In the suspension polymerization method, first, a polymerizable monomer for producing a binder resin and, if necessary, a colorant and other additives are uniformly dissolved or dispersed using a disperser such as a ball mill or an ultrasonic disperser to prepare a polymerizable monomer composition (step of preparing a polymerizable monomer composition). At this time, a polyfunctional monomer, a chain transfer agent, a wax as a release agent, a charge control agent, a plasticizer, and the like can be appropriately added as necessary.

Next, the polymerizable monomer composition is put into an aqueous medium prepared in advance, and droplets composed of the polymerizable monomer composition are formed into toner particles of desired size by using a stirrer or a disperser having a high shearing force (granulation step).

It is preferable that the aqueous medium in the granulation step include a dispersion stabilizer in order to control the particle diameter of the toner particles, sharpen the particle size distribution, and suppress coalescence of the toner particles in the production process. Dispersion stabilizers are generally roughly classified into polymers that develop a repulsive force due to steric hindrance and hardly water-soluble inorganic compounds that achieve dispersion stabilization with an electrostatic repulsive force. Fine particles of a hardly water-soluble inorganic compound are preferably used because they are dissolved by an acid or an alkali and can be dissolved and easily removed by washing with an acid or an alkali after polymerization.

After the granulation step or while performing the granulation step, the temperature is preferably set to at least 50° C. and not more than 90° C. to polymerize the polymerizable monomer contained in the polymerizable monomer composition and obtain a toner particle-dispersed solution (polymerization step).

In the polymerization step, it is preferable to perform a stirring operation so that the temperature distribution in the container is uniform. Where a polymerization initiator is added, the addition can be performed at an arbitrary timing and for a required time. In addition, the temperature may be raised in the latter half of the polymerization reaction for the purpose of obtaining a desired molecular weight distribution. Furthermore, in order to remove the unreacted polymerizable monomer and by-products from the system, part of the aqueous medium may be removed by distillation in the latter half of the reaction or after completion of the reaction. The distillation operation can be performed under normal or reduced pressure.

From the viewpoint of obtaining a high-definition and high-resolution image, the toner preferably has a weight average particle diameter of at least 3.0 μm and not more than 10.0 μm. The weight average particle diameter of the toner can be measured by a pore electric resistance method. The measurement can be performed, as described above, by using "Coulter Counter Multisizer 3" (manufactured by Beckman Coulter, Inc.). The toner particle-dispersed solution thus obtained is sent to a filtration step for solid-liquid separation of the toner particles and the aqueous medium.

The solid-liquid separation for obtaining toner particles from the obtained toner particle-dispersed solution can be carried out by a general filtration method. Thereafter, in order to remove foreign matter that could not be removed from the toner particle surface, it is preferable to perform reslurrying or further washing with running washing water or the like. After sufficient washing has been performed, solid-liquid separation is performed again to obtain a toner cake. Thereafter, the toner cake is dried by a known drying means, and if necessary, a particle group having a particle diameter outside the predetermined range is separated by classification to obtain toner particles. The separated particles having a particle diameter outside the predetermined range may be reused to improve the final yield.

Method for Measuring Martens Hardness of Toner

Hardness is one of the mechanical properties at or near the surface of an object. Hardness represents resistance of the object to deformation and scratching when the object is about to be deformed or scratched by foreign matter. Various measurement methods and definitions are known for hardness. For example, the appropriate measurement method is used according to the size of the measurement region. When the measurement region is 10 μm or more, the Vickers method is often used, when the measurement region is 10 μm or less, the nanoindentation method is used, and when the measurement region is 1 μm or less, AFM or the like is used. Regarding the definitions, Brinell hardness and Vickers hardness are used as indentation hardness, Martens hardness is used as scratch hardness, and Shore hardness is used as rebound hardness.

In the measurement of toner, since the general particle diameter is at least 3 μm and not more than 10 μm, the nanoindentation method is preferably used. According to the study conducted by the inventors, Martens hardness representing scratch hardness is appropriate to stipulate the hardness for improving the effect of the present invention. This is thought to be so because the scratch hardness can represent the resistance of the toner to scratching by a hard substance such as a metal or an external additive in the developing machine.

With the method for measuring the Martens hardness of the toner by the nanoindentation method, the hardness can be calculated from a load-displacement curve obtained in accordance with the procedure of the indentation test stipulated by ISO14577-1 in a commercially available apparatus conforming to ISO14577-1. In the present embodiment, an ultra-fine indentation hardness tester "ENT-1100b" (manufactured by Elionix Inc.) was used as an apparatus conforming to the ISO standard. The measurement method is described in the "ENT1100 operation manual" provided with the apparatus. The specific measurement method is as follows.

The measurement environment was maintained at 30.0° C. inside a shield case with a provided temperature control device. Keeping the ambient temperature constant is effective in terms of reducing variations in measurement data due to thermal expansion and drift. The set temperature was 30.0° C., assuming a temperature in the vicinity of the developing machine where the toner was rubbed. The sample stage used was a standard sample stage provided with the apparatus. After applying the toner, weak air flow was blown so that the toner was dispersed, and the sample stage was set on the apparatus and held for 1 h or more, and then the measurement was performed.

The measurement was performed using a flat indenter (titanium indenter, tip is made of diamond) having a 20 μm square tip and provided with the apparatus. A flat indenter was used because where a sharp indenter is used with respect to a small-diameter and spherical object, an object to which an external additive is attached, or an object having irregularities on the surface, such as a toner, the measurement accuracy is greatly affected. The maximum load of the test is set to $2.0 \times 10^{-4}$ N. By setting this test load, it is possible to measure the hardness without fracturing the surface layer of the toner under the condition corresponding to the stress applied to one toner particle in the developing unit. In the present invention, since friction resistance is important, it is important to measure hardness while maintaining the surface layer without breaking.

The particle to be measured is selected such that the toner alone is present on the measurement screen (field size: 160 μm width, 120 μm length) of a microscope provided with the apparatus. However, in order to eliminate the displacement error as much as possible, a particle having a particle diameter (D) in the range of ±0.5 μm of the number average particle diameter (D1) (D1−0.5 μm≤D≤D1+0.5 μm) is selected. The particle diameter of the particles to be measured is measured by measuring the major axis and minor axis of the toner using software provided with the apparatus, and taking [(major axis+minor axis)/2] as the particle diameter D (μm). The number average particle diameter is measured by using "Coulter Counter Multisizer 3" (manufactured by Beckman Coulter, Inc.) by a method described below.

Measurement of Particle Diameter of Toner (Particle)

A precision particle size distribution measuring apparatus (trade name: Coulter Counter Multisizer 3) based on a pore electric resistance method and dedicated software (trade name: Beckman Coulter Multisizer 3, Version 3.51, manufactured by Beckman Coulter, Inc.) were used. The aperture diameter was 100 μm, the number of effective measurement channels was 25,000, and the measurement data were analyzed and calculated. The electrolytic aqueous solution used for the measurement was ISOTON II (trade name) manufactured by Beckman Coulter, which was prepared by dissolving special grade sodium chloride in ion exchanged water so as to have a concentration of about 1% by mass. Prior to measurement and analysis, the dedicated software was set as follows.

In the "CHANGE STANDARD MEASUREMENT METHOD (SOM) SCREEN" of the dedicated software, the total count number in the control mode was set to 50,000 particles, the number of measurements was set to 1, and a value obtained using "standard particles 10.0 μm" (manufactured by Beckman Coulter, Inc.) was set as a Kd value. The threshold and the noise level were automatically set by pressing a measurement button of threshold/noise level. Further, the current was set to 1600 μA, the gain was set to 2, the electrolytic solution was set to ISOTON II (trade name), and flush of aperture tube after measurement were checked.

In the "PULSE TO PARTICLE DIAMETER CONVERSION SETTING SCREEN" of the dedicated software, the bin interval was set to a logarithmic particle diameter, the particle diameter bin was set to a 256-particle diameter bin, and a particle diameter range was set at least 2 μm and not more than 60 μm.

The specific measurement method is described hereinbelow.

(1) Approximately 200 mL of the electrolytic aqueous solution was placed in a glass 250 mL round-bottom beaker dedicated to Multisizer 3, the beaker was set in a sample stand, and stirring with a stirrer rod was carried out counterclockwise at 24 revolutions per second. Dirt and air bubbles in the aperture tube were removed by the "FLUSH OF APERTURE TUBE" function of the dedicated software.

(2) About 30 mL of the electrolytic aqueous solution was placed in a glass 100 mL flat-bottom beaker. Then, about 0.3 mL of a diluted solution obtained by 3-fold mass dilution of "CONTAMINON N" (trade name) (10% by mass aqueous solution of a neutral detergent for washing precision measuring instruments, manufactured by Wako Pure Chemical Industries, Ltd.) with ion exchanged water was added.

(3) A predetermined amount of ion exchanged water and about 2 mL of the CONTAMINON N (trade name) were added to a water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees.

(4) The beaker of (2) hereinabove was set in the beaker fixing hole of the ultrasonic disperser, and the ultrasonic disperser was actuated. Then, the height position of the beaker was adjusted so that the resonance state of the liquid surface of the electrolytic aqueous solution in the beaker was maximized.

(5) About 10 mg of the toner was added little by little to the electrolytic aqueous solution and dispersed therein in a state in which the electrolytic aqueous solution in the beaker of (4) hereinabove was irradiated with ultrasonic waves. Then, the ultrasonic dispersion process was further continued for 60 sec. In the ultrasonic dispersion, the water temperature in the water tank was appropriately adjusted to a temperature at least 10° C. and not more than 40° C.

(6) The electrolytic aqueous solution of (5) hereinabove in which the toner was dispersed was dropped using a pipette into the round bottom beaker of (1) hereinabove which was set in the sample stand, and the measurement concentration was adjusted to be about 5%. Then, measurement was conducted until the number of particles to be measured reached 50,000.

(7) The measurement data were analyzed with the dedicated software provided with the apparatus, and the weight average particle diameter (D4) was calculated. The "AVERAGE DIAMETER" on the analysis/volume statistical value (arithmetic mean) screen when the dedicated software is set to graph/volume % is the weight average particle diameter (D4). The "AVERAGE DIAMETER" on the analysis/number statistical value (arithmetic mean) screen when the dedicated software is set to graph/number % is the number average particle diameter (D1).

The measurement is performed by selecting at random 100 toner particles having the particle diameter D (μm) satisfying the above conditions. The conditions inputted at the time of measurement are as follows.
Test Mode: Loading-Unloading Test
Test load: $2.0 \times 10^{-4}$ N or $9.8 \times 10^{-4}$ N
Number of divisions: 1000 steps
Step interval: 10 msec Where the measurement is performed by selecting "Data Analysis (ISO)" from the analysis menu, the Martens hardness is analyzed with the software, which is provided with the apparatus, after the measurement and outputted. The above measurement is performed on 100 toner particles, and the arithmetic average value is taken as the Martens hardness in the present invention.

In addition, a means for adjusting the Martens hardness, when measuring under the condition of the maximum load of $2.0 \times 10^{-4}$ N, to the range at least 200 MPa and not more than 1100 MPa is not particularly limited. However, since the hardness is significantly higher than the hardness of organic resins used in general toners, the required level is difficult to achieve with a means usually used to increase the hardness. For example, the required level is difficult to achieve by designing a resin with a high glass transition temperature, increasing the resin molecular weight, performing thermosetting, adding a filler to the surface layer, and the like.

The Martens hardness of an organic resin used for a general toner is about at least 50 MPa and not more than 80 MPa when measured under a maximum load of $2.0 \times 10^{-4}$ N. Furthermore, even when the hardness is increased by resin design or by increasing the molecular weight, the hardness is about 120 MPa or less. Further, even when a filler such as a magnetic substance or silica is filled in the vicinity of the surface layer followed by thermal curing, the hardness is about 180 MPa or less. Thus, the toner of the present invention is significantly harder than a general toner.

Hardness Control Method

A means for adjusting the hardness of the toner can be exemplified by a method in which the surface layer of the toner is formed of a substance such as an inorganic substance having an appropriate hardness, and the chemical structure and macro structure thereof are controlled to have an appropriate hardness.

As a specific example, an organosilicon polymer can be mentioned as a substance having such specific hardness, and the hardness thereof can be adjusted by the number of carbon atoms directly bonded to the silicon atom, the carbon chain length, and the like of the organosilicon polymer as a material selection.

It is preferable that the toner particle have a surface layer including an organosilicon polymer, and the average number of carbon atoms directly bonded to a silicon atom of the organosilicon polymer be at least 1 and not more than 3 per one silicon atom (preferably, on average, at least 1 and not more than 2 and more preferably 1) because the hardness is easy to adjust to a specific value.

As a means for adjusting the Martens hardness by the chemical structure, it is possible to adjust the chemical structure such as the crosslinking of the surface layer material and the degree of polymerization. As a means for adjusting the Martens hardness by the macro structure, it is possible to adjust the surface layer unevenness and the network structure connecting the protrusions. When an organosilicon polymer is used as a surface layer, these adjustments can be made by adjusting the pH, concentration, temperature, time, and the like when pretreating the organosilicon polymer. Further, the adjustment can be performed by the timing, form, concentration, reaction temperature, and the like of the surface coating of the organosilicon polymer on the core particle of the toner particle.

In the present embodiment, the following method is particularly preferable. First, core particles of toner particles are manufactured and dispersed in an aqueous medium to obtain a core particle-dispersed solution. Regarding the concentration at this time, it is preferable that the dispersion be performed at a concentration such that the solid fraction of the core particles is at least 10% by mass and not more than 40% by mass with respect to the total amount of the core particle-dispersed solution. The temperature of the core particle-dispersed solution is preferably adjusted to 35° C. or higher. The pH of the core particle-dispersed solution is preferably adjusted to a pH at which the condensation of the organosilicon compound is unlikely to proceed. Since the pH at which the condensation of the organosilicon polymer is unlikely to proceed differs depending on the substance, it is preferably within ±0.5, centering on the pH at which the reaction is most difficult to proceed.

Meanwhile, it is preferable to use an organosilicon compound subjected to hydrolysis. For example, hydrolysis in a separate container is performed as a pretreatment of the organosilicon compound. The finish concentration of hydrolysis is preferably at least 40 parts by mass and not more than 500 parts by mass, and more preferably at least 100 parts by mass and not more than 400 parts by mass of water from which ions have been removed, such as ion exchanged water or RO water, when the amount of the organosilicon compound is 100 parts by mass. The hydrolysis conditions are preferably a pH of 2 to 7, a temperature of 15° C. to 80° C., and a time of 30 min to 600 min.

By mixing the obtained hydrolysate and the core particle-dispersed solution and adjusting the pH to be suitable for condensation (preferably 6 to 12, or 1 to 3, and more preferably 8 to 12), the organosilicon compound can be coated on the core particle of the toner particle while being condensed. The condensation and surface layer formation are preferably performed at 35° C. or higher for 60 min or longer. In addition, the macro structure of the surface can be adjusted by adjusting the holding time at 35° C. or higher before adjusting to a pH suitable for condensation, but in order to easily obtain a specific Martens hardness, the holding time of at least 3 min and not more than 120 min is preferable.

By the means as described above, the amount of the reaction residue can be reduced, unevenness can be formed on the surface layer, and a network structure can be formed between the projections. Therefore, a toner having the specific Martens hardness can be easily obtained.

Surface Layer Including Organosilicon Polymer

As shown in FIG. 6, in the present embodiment, a toner particle 40 is used that has a surface layer 40b including an organosilicon polymer on a toner base particle 40a.

When the particle has a surface layer including an organosilicon polymer, it preferably has a structure represented by the formula (1).

 Formula (1)

(R represents a hydrocarbon group having at least 1 and not more than 6 carbon atoms.)

In the organosilicon polymer having the structure of the formula (1), one of the four valences of Si atoms is bonded to R, and the remaining three are bonded to O atoms. The O atoms constitute a state in which two valences are both bonded to Si, that is, a siloxane bond (Si—O—Si). Considering Si atoms and O atoms constituting the organosilicon polymer, there are three O atoms for two Si atoms, and therefore, the representation is as —SiO$_{3/2}$. The —SiO$_{3/2}$ structure of this organosilicon polymer is considered to have properties similar to silica (SiO$_2$) configured of a large number of siloxane bonds. Accordingly, it is considered that the Martens hardness can be higher than that of the organic resin and lower than that of the inorganic silica because the structure is closer to an inorganic material than the toner in which the surface layer is formed of the conventional organic resin.

In the structure represented by the formula (1), R is preferably a hydrocarbon group having at least 1 and not more than 6 carbon atoms. As a result, the charge amount is likely to be stable. In particular, an aliphatic hydrocarbon group having at least 1 and not more than 5 carbon atoms, or a phenyl group which is excellent in environmental stability is preferable.

In addition, it is more preferable that R be a hydrocarbon group having at least 1 and not more than 3 carbon atoms for further improving the charging performance. When the charging performance is good, the transfer property is good and the amount of residual toner is small, so that the contamination of the drum, the charging member and the transfer member is reduced.

Preferred examples of the hydrocarbon group having at least 1 and not more than 3 carbon atoms include a methyl group, an ethyl group, a propyl group, and a vinyl group. From the viewpoints of environmental stability and storage stability, R is more preferably a methyl group.

As a production example of the organosilicon polymer, a sol-gel method is preferable. The sol-gel method is a method in which a liquid raw material is used as a starting material for hydrolysis and condensation polymerization, and gelation is performed through a sol state. This method is used for synthesizing glass, ceramics, organic-inorganic hybrids, and nanocomposites. By using this production method, functional materials having various shapes such as surface layers, fibers, bulk bodies, and fine particles can be produced from a liquid phase at a low temperature.

Specifically, the organosilicon polymer present in the surface layer of the toner particle is preferably produced by hydrolysis and polycondensation of a silicon compound typified by an alkoxysilane.

By providing the toner particle with a surface layer including this organosilicon polymer, environmental stability is improved, the toner performance is less likely to deteriorate during long-term use, and a toner having excellent storage stability can be obtained.

Furthermore, since the sol-gel method starts with a liquid and forms a material by gelling the liquid, various fine structures and shapes can be created. In particular, where the toner particle is produced in an aqueous medium, precipitation on the surface of the toner particle is facilitated due to the hydrophilicity created by a hydrophilic group such as a silanol group of the organosilicon compound. The fine structure and shape can be adjusted by the reaction temperature, reaction time, reaction solvent, pH, type and amount of the organometallic compound, and the like.

The organosilicon polymer of the surface layer of the toner particle is preferably a polycondensation product of an organosilicon compound having a structure represented by a following formula (Z).

[Chem. 1]

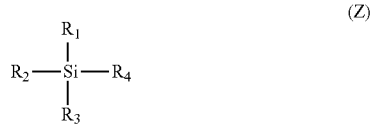

(Z)

(In the formula (Z), $R_1$ represents a hydrocarbon group having at least 1 and not more than 6 carbon atoms, and $R_2$, $R_3$, and $R_4$ each independently represent a halogen atom, a hydroxy group, an acetoxy group, or an alkoxy group.)

The hydrophobicity can be improved by the hydrocarbon group (preferably an alkyl group) of $R_1$, and a toner particle having excellent environmental stability can be obtained. Further, an aryl group, which is an aromatic hydrocarbon group, such as a phenyl group, can also be used as the hydrocarbon group. Since charge quantity fluctuation in various environments tends to increase when the hydrophobicity of $R_1$ is large, in view of environmental stability, $R_1$ is preferably a hydrocarbon group having at least 1 and not more than 3 carbon atoms, and more preferably a methyl group.

$R_2$, $R_3$, and $R_4$ are each independently a halogen atom, a hydroxy group, an acetoxy group, or an alkoxy group (hereinafter also referred to as a reactive group). These reactive groups are hydrolyzed, addition-polymerized and condensation-polymerized to form a crosslinked structure, and a toner having excellent resistance to member contamination and development durability can be obtained. The hydrolyzation ability is moderate at room temperature, and from the viewpoint of precipitation on the surface of toner particle and coverage, an alkoxy group having at least 1 and not more than 3 carbon atoms is preferable, and a methoxy group or an ethoxy group is more preferable. Further, hydrolysis of $R_2$, $R_3$ and $R_4$, addition polymerization and condensation polymerization can be controlled by the reaction temperature, reaction time, reaction solvent and pH.

In order to obtain the organosilicon polymer used in the present embodiment, organosilicon compounds having three reactive groups ($R_2$, $R_3$, and $R_4$) in one molecule excluding $R_1$ in the formula (Z) shown above (hereinafter, referred to as trifunctional silane) may be used alone or in combination.

Further, the amount of the organosilicon polymer in the toner particle is preferably at least 0.5% by mass and not more than 10.5% by mass.

Where the amount of the organosilicon polymer is 0.5% by mass or more, the surface free energy of the surface layer can be further reduced, the flowability is improved, and the occurrence of member contamination or fogging can be suppressed. Where the amount is 10.5 mass % or less, it is possible to make it difficult for charge-up to occur. The amount of the organosilicon polymer is controlled by the type and amount of the organosilicon compound used for forming the organosilicon polymer, the method for producing the toner particle at the time of forming the organosilicon polymer, the reaction temperature, reaction time, reaction solvent and pH.

The surface layer including the organosilicon polymer and the toner core particle are preferably in contact with each other without any gap. As a result, the occurrence of bleeding of the resin component and the release agent located on the inner side of the toner particle with respect to the surface layer can be suppressed, and a toner having excellent storage stability, environmental stability, and development durability can be obtained. In addition to the above organosilicon polymer, the surface layer may include a resin such as a styrene-acrylic copolymer resin, a polyester resin, an urethane resin, various additives, and the like.

External Additive

The toner particles can be made into toner without external additives, but in order to improve flowability, charging performance, cleaning properties, and the like, a fluidizing agent, a cleaning aid, and the like, which are the so-called external additives, may be added to obtain a toner.

Examples of the external additive include inorganic oxide fine particles composed of alumina fine particles, titanium oxide fine particles, and the like, inorganic stearic acid compound fine particles such as aluminum stearate fine particles, zinc stearate fine particles, and the like, and inorganic titanic acid compound fine particles such as strontium titanate, zinc titanate and the like. These can be used alone or in combination of two or more.

These inorganic fine particles are preferably subjected to surface treatment with a silane coupling agent, a titanium coupling agent, a higher fatty acid, silicone oil or the like in order to improve heat-resistant storage stability and environmental stability. The BET specific surface area of the external additive is preferably at least 10 m$^2$/g and not more than 450 m$^2$/g.

The BET specific surface area can be determined by a low-temperature gas adsorption method using a dynamic constant pressure method according to a BET method (preferably a BET multipoint method). For example, the BET specific surface area (m$^2$/g) can be calculated by using a specific surface area measuring device (trade name: GEMINI 2375 Ver. 5.0, manufactured by Shimadzu Corporation), causing nitrogen gas adsorption on the sample surface, and performing measurement using the BET multipoint method.

The total addition amount of these various external additives is preferably at least 0.05 parts by mass and not more than 5 parts by mass, and more preferably at least 0.1 parts by mass and not more than 3 parts by mass with respect to 100 parts by mass of the toner particles. Further, various external additives may be used in combination.

The toner may have a positively charged particle on the surface of the toner particle. The number average particle diameter of the positively charged particles is preferably at least 0.10 μm and not more than 1.00 μm, and more preferably at least 0.20 μm and not more than 0.80 μm.

It was made clear that where such positively charged particles are present, good transfer efficiency is achieved through durable use. This is conceivable because the positively charged particles having such a particle diameter can roll on the surface of the toner particles and are rubbed between the photosensitive drum 1 and the transfer belt 31 to promote negative charging of the toner, which results in suppression of conversion to a positive charge by the application of transfer bias. The toner of the present invention is characterized by a hard surface, and since positively charged particles are not easily adhered to or buried in the surface of the toner particle, the transfer efficiency can be kept high.

The positively charged particles in the present embodiment are particles that are positively charged when triboelectrically charged by mixing and stirring with a standard carrier (anionic: N-01) provided by the Imaging Society of Japan.

The number average particle diameter of the external additive is measured using a scanning electron microscope "S-4800" (manufactured by Hitachi, Ltd.). The toner with the external additive externally added thereto is observed, and the major axis of 100 primary particles of the external additive is randomly measured in the field of view enlarged to a maximum of 200,000 times to determine the number average particle diameter. The observation magnification is adjusted, as appropriate, according to the size of the external additive.

Various methods are conceivable as means for causing positively charged particles to be present on the surface of the toner particle, and any method may be used, but a method of attaching by external addition is preferred. It was found that where the Martens hardness of the toner is within the range of the present invention, the positively charged particles are likely to be uniformly present on the surface of the toner particle. The adhesion ratio of the positively charged particles to the toner particle is preferably at least 5% and not more than 75%, and more preferably at least 5% and not more than 50%. When the adhesion ratio is within this range, it is possible to maintain high transfer efficiency by promoting triboelectric charging of the toner particles and positively charged particles. A method for measuring the adhesion ratio will be described hereinbelow.

As the kind of positively charged particles, hydrotalcite, titanium oxide, a melamine resin and the like are preferable. Of these, hydrotalcite is particularly preferable.

Method for Preparing THF-Insoluble Fraction of Toner Particle for NMR Measurement The tetrahydrofuran (THF)-insoluble fraction of toner particles was prepared in the following manner.

A total of 10.0 g of toner particles were weighed and put into a cylindrical filter paper (No. 86R manufactured by Toyo Filter Paper K.K.) and put on a Soxhlet extractor. Extraction was carried out for 20 h using 200 mL of THF as a solvent, and the residue obtained by vacuum drying the filtrate in the cylindrical filter paper at 40° C. for several hours was taken as the THF-insoluble fraction of the toner particles for NMR measurement.

Where the surface of the toner particle is treated with an external additive or the like, the external additive is removed by the following method to obtain a toner particle.

A total of 160 g of sucrose (manufactured by Kishida Chemical Co., Ltd.) is added to 100 mL of ion exchanged water and dissolved while forming a hot water bath to prepare a concentrated sucrose solution. Then, 31 g of the concentrated sucrose solution and 6 mL of CONTAMINON N (10% by mass aqueous solution of a neutral detergent for washing precision measuring instruments of pH 7 consisting of a nonionic surfactant, an anionic surfactant, and an organic builder, manufactured by Wako Pure Chemical Industries, Ltd.) are placed in a centrifuge tube (capacity 50 mL) to prepare a dispersion. To this dispersion, 1.0 g of the toner is added, and the lump of the toner is loosened with a spatula or the like.

The centrifuge tube is shaken with a shaker at 350 spm (strokes per min) for 20 min. After shaking, the solution is transferred to a glass tube for a swing rotor (capacity 50 mL), and separated by a centrifuge (H-9R manufactured by Kokusan Co., Ltd.) at 3500 rpm for 30 min. By this operation, the toner particles are separated from the detached external additive. It is visually confirmed that the toner and the aqueous solution are sufficiently separated, and the toner separated in the uppermost layer is collected with a spatula or the like. The collected toner is filtered with a vacuum filter and then dried with a dryer for 1 h or longer to obtain toner particles. This operation is performed multiple times to ensure the required amount.

Confirmation Method of Structure Shown by Formula (1)

The following method is used to confirm the structure represented by the formula (1) in the organosilicon polymer contained in the toner particle.

The hydrocarbon group represented by R in the formula (1) was confirmed by $^{13}$C-NMR.

Measurement Conditions for $^{13}$C-NMR (Solid)

Equipment: JNM-ECX500II made by JEOL RESONANCE Co., Ltd.

Sample tube: 3.2 mmφ

Sample: 150 mg of tetrahydrofuran-insoluble fraction of toner particles for NMR measurement Measurement temperature: room temperature Pulse mode: CP/MAS Measurement nuclear frequency: 123.25 MHz ($^{13}$C)

Reference substance: adamantane (external standard: 29.5 ppm)

Sample rotation speed: 20 kHz

Contact time: 2 ms

Delay time: 2 s

Integration count: 1024 times

In this method, a hydrocarbon group represented by R in the formula (1) was confirmed by the presence or absence of a signal due to a methyl group (Si—CH$_3$), an ethyl group (Si—C$_2$H$_5$), a propyl group (Si—C$_3$H$_7$), a butyl group (Si—C$_4$H$_9$), a pentyl group (Si—C$_5$H$_{11}$), a hexyl group (Si—C$_6$H$_{13}$) or a phenyl group (Si—C$_6$H$_5$—) bonded to a silicon atom.

Calculation Method of Proportion of Peak Area Attributed to Structure of Formula (1) in Organosilicon Polymer Included in Toner Particle The measurement of $^{29}$Si-NMR (solid) of the THF insoluble fraction of toner particles is performed under the following measurement conditions.

Measurement Conditions for $^{29}$Si-NMR (Solid)
Equipment: JNM-ECX500II made by JEOL RESONANCE Co., Ltd.
Sample tube: 3.2 mmφ
Sample: 150 mg of tetrahydrofuran-insoluble fraction of toner particles for NMR measurement
Measurement temperature: room temperature
Pulse mode: CP/MAS
Measurement nuclear frequency: 97.38 MHz ($^{29}$Si)
Reference substance: DSS (external standard: 1.534 ppm)
Sample rotation speed: 10 kHz
Contact time: 10 ms
Delay time: 2 s
Integration count: 2000 times to 8000 times After the above measurement, a plurality of silane components having different substituents and bonding groups in the tetrahydrofuran-insoluble fraction of the toner particles are separated into peaks by curve fitting into the following structure X1, structure X2, structure X3, and structure X4.

Structure X1: (R$i$)(R$j$)(R$k$)SiO$_{1/2}$ (2)

Structure X2: (R$g$)(R$h$)Si(O$_{1/2}$)$_2$ (3)

Structure X3: R$m$Si(O$_{1/2}$)$_3$ (4)

Structure X4: Si(O$_{1/2}$)$_4$ (5)

[Chem. 2]

X1 Structure:

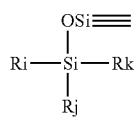

(2)

X2 Structure:

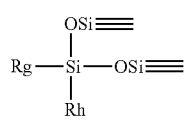

(3)

X3 Structure:

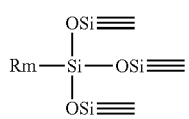

(4)

X4 Structure:

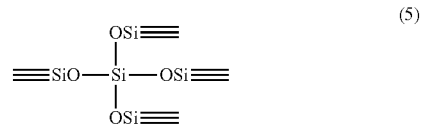

(5)

(In the formulas (2), (3) and (4), Ri, Rj, Rk, Rg, Rh, and Rm represent an organic group such as a hydrocarbon group having from 1 to 6 carbon atoms, a halogen atom, a hydroxy group, an acetoxy group or an alkoxy group bonded to silicon.)

In addition, when it is necessary to confirm the structure represented by the above formula (1) in greater detail, the structure may be identified by the measurement result of $^1$H-NMR together with the measurement result of $^{13}$C-NMR and $^{29}$Si-NMR.

Examples

A charging roller 2-1 in the examples of the present invention will be described hereinbelow.

Charging Roller 2-1

Figure 3:
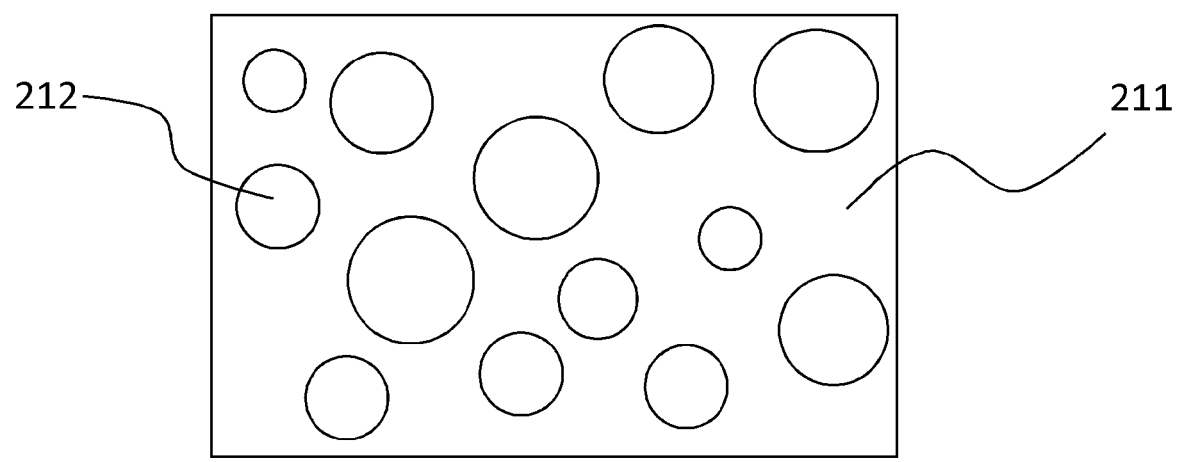
FIG. 3 is a schematic diagram for explaining the sea-island structure in the embodiment of the present invention.

As shown in FIG. 3, an elastic layer 222 of the charging roller 2-1 is formed of domains 212 that form an island portion and a matrix 211 that forms a sea portion.

Method for Producing Charging Roller 2-1

Hereinafter, the present invention will be described more specifically with reference to production examples and examples, but these do not limit the present invention in any way. All the parts in the following blends are on the mass basis.

A total of 100 parts of ethylene-propylene-diene terpolymer (EPT4045, manufactured by Mitsui Petrochemical Co., Ltd.) as the raw material rubber A, 10 parts of Ketjen black (Ketjen Black EC600JD, manufactured by Ketjen Black International Co.) as conductive particles, and 1 part of stearic acid and 3 parts of zinc oxide as processing aids were kneaded with a pressure kneader to obtain a master batch 1.

Next, 75 parts of acrylonitrile-butadiene copolymer (Nipol DN219 manufactured by Nippon Zeon Co., Ltd.) as the raw material rubber B, 1 part of stearic acid and 3 parts of zinc oxide as processing aids, 25 parts of a master batch 1, 0.5 parts of sulfur as a vulcanizing agent, 1.5 parts of tetramethylthiuram disulfide (Nocceller TT, manufactured by Ouchi Shinko Chemical Industrial Co., Ltd.) as a vulcanization aid, and 2.0 parts of N-cyclohexyl-2-benzothiaz-olylsulfenamide (Nocceller CZ, manufactured by Ouchi Shinko Chemical Industrial Co., Ltd.) were mixed with an open roll to obtain an unvulcanized rubber composition.

Next, a round bar having a total length of 252 mm and an outer diameter of 6 mm was prepared by subjecting the surface of free-cutting steel to electroless nickel plating. An adhesive was applied over the entire circumference of the round bar in a range of 230 mm excluding 11 mm at both ends. A conductive hot-melt type adhesive was used. A roll coater was used for coating. In this Example, the round bar coated with the adhesive was used as a conductive shaft core (core 221) (see FIG. 4).

Next, a crosshead extruder having a conductive shaft core supply mechanism and an unvulcanized rubber roller discharge mechanism was prepared, a die having an inner diameter of 10.5 mm was attached to the crosshead, the extruder and the crosshead were adjusted to 80° C., and the conveyance speed of the conductive shaft core was adjusted to 60 mm/sec. Under these conditions, the unvulcanized rubber composition was supplied from the extruder, and the unvulcanized rubber composition was coated on the conductive shaft core (core 221) within the crosshead as an elastic layer (elastic layer 222) to obtain an unvulcanized rubber roller. Next, the unvulcanized rubber roller was put in a hot-air vulcanization furnace at 170° C. and heated for 60 min to obtain an unpolished conductive elastic roller. Then, the end parts of the elastic layer were cut and removed. Finally, the surface of the elastic layer was polished with a rotating grindstone. As a result, a charging roller 2-1 having a diameter of 8.4 mm at positions of 90 mm from the central portion to both end portions and a central diameter of 8.5 mm was obtained.

An ultrathin slice having a thickness of about 0.1 µm was prepared from the elastic layer 222 of the charging roller 2-1 obtained as described above, and the dispersion state of the polymer and the dispersion state of the conductive particles were observed under a transmission electron microscope (TEM). As a result, it was confirmed that the elastic layer 222 of the charging roller 2-1 was formed of the domains 212 forming the island portion and the matrix 211 forming the sea portion. Further, the volume resistivity of the domains 212 and the matrix 211 was measured using an atomic force microscope (AFM), and it was confirmed that the matrix 211 had a higher volume resistivity than the domains 212.

Next, the electrical characteristics of the charging roller 2-1 were measured. As a result, the electric resistance value in a low-temperature and low-humidity environment (15° C., 10% RH, hereinafter referred to as L/L) was $1.8 \times 10^5 \Omega$ when 25 V was applied and $9.0 \times 10^4 \Omega$ when 100 V was applied, and the circumferential unevenness was 1.3 times. The JIS-A hardness of the elastic layer 222 of the charging roller 2-1 was 52°.

A method for producing toners a to c used in the examples will be described hereinbelow.

Toner a

Step of Preparing Aqueous Medium 1

A total of 14.0 parts of sodium phosphate (RASA Industries, Ltd., dodecahydrate) was added to 1000.0 parts of ion exchanged water in a reaction vessel, and kept at 65° C. for 1.0 h while purging with nitrogen.

An aqueous calcium chloride solution obtained by dissolving 9.2 parts of calcium chloride (dihydrate) in 10.0 parts of ion exchanged water was loaded while stirring at 12,000 rpm using a T. K. Homomixer (manufactured by Tokushu Kika Kogyo Co., Ltd.) to prepare an aqueous medium including a dispersion stabilizer. Furthermore, 10% by mass hydrochloric acid was added to the aqueous medium, and the pH was adjusted to 5.0, whereby an aqueous medium 1 was obtained.

Step of Hydrolyzing Organosilicon Compound for Surface Layer

In a reaction vessel equipped with a stirrer and a thermometer, 60.0 parts of ion exchanged water was weighed and the pH was adjusted to 3.0 using 10% by mass hydrochloric acid. Heating was then performed under stirring to bring the temperature to 70° C. Thereafter, 40.0 parts of methyltriethoxysilane, which is an organosilicon compound for the surface layer, was added and stirred for 2 h or longer to conduct hydrolysis. The end point of hydrolysis was visually confirmed by the formation of a single layer, without separation, of oil and water, and cooling was performed to obtain a hydrolysate of the organosilicon compound for the surface layer.

Step of Preparing Polymerizable Monomer Composition

| Styrene | 60.0 parts |
| C. I. Pigment Blue 15:3 | 6.5 parts |

The aforementioned materials were put into an attritor (manufactured by Mitsui Miike Chemical Engineering Machinery, Co., Ltd.), and further dispersed using zirconia particles having a diameter of 1.7 mm at 220 rpm for 5.0 h to prepare a pigment-dispersed solution. The following materials were added to the pigment-dispersed solution.

| Styrene | 20.0 parts |
| n-Butyl acrylate | 20.0 parts |
| Crosslinking agent (divinylbenzene) | 0.3 parts |
| Saturated polyester resin | 5.0 parts |

(Polycondensation product of propylene oxide-modified bisphenol A (2 mol adduct) and terephthalic acid (molar ratio 10:12), glass transition temperature Tg=68° C., weight average molecular weight Mw=10,000, molecular weight distribution Mw/Mn=5.12)

| Fischer-Tropsch wax (melting point 78° C.) | 7.0 parts |

The pigment-dispersed solution to which the above materials were added was kept at 65° C. and uniformly dissolved and dispersed at 500 rpm using a T. K. Homomixer (manufactured by Tokushu Kika Kogyo Co., Ltd.) to prepare a polymerizable monomer composition.

Granulation Step

The polymerizable monomer composition was loaded into the aqueous medium 1 while maintaining the temperature of the aqueous medium 1 at 70° C. and the rotational speed of the T. K. Homomixer at 12,000 rpm, and 9.0 parts of t-butyl peroxypivalate as a polymerization initiator was added. The mixture was granulated for 10 min while maintaining 12,000 rpm of the stirring device.

Polymerization Step

After the granulation step, the stirrer was replaced with a propeller stirring blade and polymerization was performed for 5.0 h while maintaining at 70° C. under stirring at 150 rpm, and then polymerization reaction was carried out by raising the temperature to 85° C. and heating for 2.0 h to obtain core particles. When the pH of the slurry was measured after cooling to 55° C., the pH was 5.0. With the stirring continued at 55° C., 20.0 parts of the hydrolysate of the organosilicon compound for the surface layer was added to start the surface layer formation on the toner. After maintaining as is for 30 min, the slurry was adjusted to pH=9.0 for completion of condensation by using an aqueous sodium hydroxide solution and further maintained for 300 min to form a surface layer.

Washing and Drying Step

After completion of the polymerization step, the toner particle slurry was cooled, hydrochloric acid was added to the toner particle slurry to adjust the pH to 1.5 or lower, the slurry was allowed to stand under stirring for 1 h, and then solid-liquid separation was performed with a pressure filter to obtain a toner cake. The toner cake was reslurried with ion exchanged water to obtain a dispersion again, followed by solid-liquid separation with the above-mentioned filter. Reslurrying and solid-liquid separation were repeated until the electric conductivity of the filtrate became 5.0 µS/cm or less, and finally solid-liquid separation was performed to obtain a toner cake.

The obtained toner cake was dried with an air flow drier FLASH JET DRIER (manufactured by Seishin Enterprise Co., Ltd.), and fine particles were cut using a multi-division classifier utilizing the Coanda effect to obtain a toner particle. The drying conditions were a blowing temperature of 90° C. and a dryer outlet temperature of 40° C., and the supply speed of the toner cake was adjusted so that the outlet temperature did not deviate from 40° C. according to the moisture content of the toner cake.

Toner e

A toner e was prepared in the same manner as in the production example of toner a, except that the conditions when adding the hydrolysate in the (Polymerization Step) and the retention time after the addition were changed as shown in Table 1. The pH of the slurry was adjusted with hydrochloric acid and sodium hydroxide aqueous solution. Table 1 shows the measurement results of the obtained toner e.

TABLE 1

| | Number of added parts of polymerization initiator | Number of added parts of cross-linking agent | Type of organosilicon compound for surface layer | Conditions when hydrolysis solution is added | | | Conditions after addition of hydrolysate | | |
|---|---|---|---|---|---|---|---|---|---|
| | | | | Slurry pH | Slurry temperature | Number of added parts of hydrolysate | Retention time till pH adjustment for condensation completion | Martens hardness ($2.0 \times 10^{-4}$ N)(Mpa) | Martens hardness ($9.8 \times 10^{-4}$ N)(Mpa) |
| Toner a | 9.0 | 0.3 | Methyl-triethoxy-silane | 5.0 | 55 | 20 | 30 | 598 | 23 |
| Toner b | | | | 9.0 | 70 | 20 | 0 | 203 | 12 |
| Toner c | | | | 5.0 | 40 | 20 | 90 | 1092 | 42 |
| Toner d | | | | 9.5 | 65 | 20 | 0 | 190 | 3 |
| Toner e | | | | 5.0 | 40 | 20 | 100 | 1110 | 111 |

In the cross-sectional TEM observation of the toner particle, silicon mapping was performed, and it was confirmed that silicon atoms were present on the surface layer. In the subsequent toner production examples, for the surface layer including the organosilicon polymer, it was also confirmed by the same silicon mapping that silicon atoms were present in the surface layer. In this production example, the obtained toner particles were used as a toner a as they were, without external addition.

Table 1 shows the measurement results of the obtained toner a. The Martens hardness was measured by the method described above.

Toner b

A toner b was prepared in the same manner as in the production example of toner a, except that the conditions when adding the hydrolysate in the (Polymerization Step) and the retention time after the addition were changed as shown in Table 1. The pH of the slurry was adjusted with hydrochloric acid and sodium hydroxide aqueous solution. Table 1 shows the measurement results of the obtained toner b.

Toner c

A toner c was prepared in the same manner as in the production example of toner a, except that the conditions when adding the hydrolysate in the (Polymerization Step) and the retention time after the addition were changed as shown in Table 1. The pH of the slurry was adjusted with hydrochloric acid and sodium hydroxide aqueous solution. Table 1 shows the measurement results of the obtained toner c.

Next, toners d to e used in the comparative examples are described.

Toner d

A toner d was prepared in the same manner as in the production example of toner a, except that the conditions when adding the hydrolysate in the (Polymerization Step) and the retention time after the addition were changed as shown in Table 1. The pH of the slurry was adjusted with hydrochloric acid and sodium hydroxide aqueous solution. Table 1 shows the measurement results of the obtained toner d.

Contents of Test

Table 2 shows combinations of charging roller and toner in the examples.

In order to confirm the occurrence of drum fusion and vertical streak images in Examples 1 to 3 and Comparative Examples 1 and 2, image samples were outputted after continuous passage of 10,000 paper sheets per day with a horizontal line of 600 dpi, 4 dots, and 10 spaces. The image sample was evaluated by printing one halftone image. The evaluation is as follows.

Drum Fusion

◯: No occurrence: no missing image portions in the form of white dots throughout the image X: Occurrence: missing image portions in the form of white dots occurred in part of the image or throughout the entire image Vertical Stripe Image ◯: No occurrence: no vertical streak-like density unevenness throughout the image X: Occurrence: vertical streak-like density unevenness occurred in part of the image or throughout the entire image Paper passing and image sample output were performed in an environment of 32° C. and 80% RH. A total of up to 50,000 sheets were passed through. LBP7700C (manufactured by Canon Inc.) and evaluation paper Vitality 75 g/m², letter size (manufactured by XEROX) were used for the test.

Confirmation of Effect

The results are shown in Table 2.

TABLE 2

| | Toner | Charging roller | Drum fusion | Vertical stripe image |
|---|---|---|---|---|
| Example 1 | Toner a | Charging roller 2-1 | ◯ | ◯ |
| Example 2 | Toner b | Charging roller 2-1 | ◯ | ◯ |

TABLE 2-continued

|  | Toner | Charging roller | Drum fusion | Vertical stripe image |
|---|---|---|---|---|
| Example 3 | Toner c | Charging roller 2-1 | ○ | ○ |
| Comparative Example 1 | Toner d | Charging roller 2-1 | X | ○ |
| Comparative Example 2 | Toner e | Charging roller 2-1 | ○ | X |

"○" in "Drum fusion" column means "No occurrence".
"X" in "Drum fusion" column means "Occurrence".
"○" in "Vertical stripe image" column means "No occurrence".
"X" in "Vertical stripe image" column means "Occurrence".

As shown in Examples 1 to 3, with the toner having a Martens hardness of 200 MPa to 1100 MPa when measured under the condition of a maximum load of $2.0\times10^{-4}$ N, no drum fusion or vertical stripe image occurred up to 50,000 prints.

This is considered to be because with the hardness of the toner of the present example, the toner is contact-triboelectrically charged by the contact portion between the charging roller 2-1 and the photosensitive drum 1 and returned to the photosensitive drum 1 by the electric field force, without being fused due to clinging of the toner at the island phase of the charging roller 2-1.

In addition, it is considered that since the toner does not fuse and repeatedly passes through the contact portion with the photosensitive drum 1 while adhering to the charging roller 2-1, the toner moves slightly on the charging roller 2-1 and can be charged by discharge when reaching the sea phase.

The toner was actually caused to adhere directly to the charging roller 2-1, and where the charging roller 2-1 was observed after 100 printing operations, it was found that the toner did not adhere.

In addition, with the hardness of the toner of this example, no vertical streak images occurred due to damage to the developing blade 6 and the developing roller 4.

In Comparative Example 1, drum fusion occurred. This is presumably because when the Martens hardness is less than 200 MPa, the toner is fused due to clinging of the toner at the island phase of the charging roller 2-1.

It was confirmed that the toner was fused to the photosensitive drum 1 after actually printing the image sample.

In Comparative Example 2, vertical streak images occurred. This is presumably because when the Martens hardness exceeds 1100 MPa, the developing blade 6 or the developing roller 4 is damaged.

When the developing blade 6 was actually observed, it was confirmed that a scraping groove of the developing blade 6 was generated at a position corresponding to the vertical stripe image. In other words, when the developing blade 6 is scraped by the toner, a scraping groove is generated, and the toner laid-on level on the developing roller 4 is increased or decreased thereby generating a vertical streak-like density unevenness image.

The setting conditions used in the description of this embodiment are merely exemplary and are not limiting.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-213884, filed on Nov. 14, 2018, which is hereby incorporated by reference herein in its entirety.

What is claimed is:

1. A process cartridge for use in an image forming apparatus, comprising:
    an image bearing member;
    a charging member configured to contact the image bearing member and charge the image bearing member;
    a developer bearing member configured to contact the image bearing member and bear a developer for developing a latent image formed on the charged image bearing member;
    wherein,
    the charging member has an electrically conductive support and an elastic layer in contact with the image bearing member;
    the elastic layer includes a semiconductive rubber composition including a matrix and domains having electric conductivity;
    the semiconductive rubber composition has a sea-island structure in which the domains form an island phase and the matrix forms a sea phase;
    the matrix has a higher volume resistivity than the domain;
    the developer includes a toner; and
    the toner has a Martens hardness of at least 200 MPa and not more than 1100 MPa when measured under a maximum load of $2.0\times10^{-4}$ N.

2. The process cartridge according to claim 1, wherein the toner has a Martens hardness of at least 5 MPa and not more than 100 MPa when measured under a maximum load of $9.8\times10^{-4}$ N.

3. The process cartridge according to claim 1, wherein the toner has a toner particle;
    the toner particle has a surface layer including an organosilicon polymer; and an average number of carbon atoms directly bonded to a silicon atom in the organosilicon polymer is at least 1 and not more than 3 per one silicon atom.

4. The process cartridge according to claim 3, wherein the organosilicon polymer has a structure represented by a following formula (1):

$$R-SiO_{3/2} \qquad \text{Formula (1)}$$

wherein R represents a hydrocarbon group having at least 1 and not more than 6 carbon atoms.

5. The process cartridge according to claim 4, wherein R as defined above is a hydrocarbon group having at least 1 and not more than 3 carbon atoms.

6. The process cartridge according to claim 1, wherein the domains include an electrically conductive particle.

7. The process cartridge according to claim 1, wherein a circumferential surface of the elastic layer that is in contact with the image bearing member is configured such that portions made of the domains are scattered on a surface composed of the matrix.

8. An image forming apparatus comprising:
an apparatus main body; and
the process cartridge according to claim 1 that is detachably attachable to the apparatus main body.

* * * * *